United States Patent [19]

Zurek et al.

[11] Patent Number: 5,390,528
[45] Date of Patent: Feb. 21, 1995

[54] METHOD AND APPARATUS FOR CALIBRATING A MASS AIR FLOW SENSOR USING AN OSCILLATING AIR FLOW

[75] Inventors: Lawrence A. Zurek, Mt. Clemens; Lorna J. Clowater, Canton, both of Mich.

[73] Assignee: Ford Motor Company, Dearborn, Mich.

[21] Appl. No.: 56,277

[22] Filed: May 3, 1993

[51] Int. Cl.⁶ ............................................. G01F 25/00
[52] U.S. Cl. ............................................................ 73/3
[58] Field of Search ............................................... 73/3

[56] References Cited

U.S. PATENT DOCUMENTS 4,393,697  7/1983  Sato et al. ................................ 73/118
4,671,097  6/1987  Kurki et al. ................................. 73/3
4,685,324  8/1987  Bourdon et al. ............................ 73/3

Primary Examiner—Thomas P. Noland
Attorney, Agent, or Firm—Roger L. May; Peter Abolins

[57] ABSTRACT

A method and apparatus for calibrating a mass air flow sensor in which the sensing elements of the sensor are subjected to an oscillating mass air flow summed with an offset mass air flow to produce the summed mass air flow. The output waveform of the mass air flow in response to the summed mass air flow is displayed on a display having a desired waveform superimposed thereon. Selected resistors in the sensor's electronic circuit are then trimmed to conform the waveform output by the mass air flow sensor with the superimposed desired waveform.

8 Claims, 2 Drawing Sheets

METHOD AND APPARATUS FOR CALIBRATING A MASS AIR FLOW SENSOR USING AN OSCILLATING AIR FLOW

TECHNICAL FIELD

The invention is related to the field of mass air flow sensors and, in particular, to a method and apparatus for calibrating a mass air flow sensor using an oscillating mass air flow.

BACKGROUND ART

The calibration of the various transfer functions of mass air flow sensors of the type taught by Sato et al in U.S. Pat. No. 4,393,697 is conventionally conducted on separate calibration test stands. The mass air flow sensor has a sensing head supporting sensing elements which are sensitive to a mass air flow rate. In current automotive applications, the sensing elements are normally entrained in an isolated or bypass channel of the engine air intake system and measures the mass air flow rate of a portion of the total mass air flow. The mass air flow sensor generates an output signal corresponding to the mass air flow rate of the air in the isolated or bypass channel. The relationship of the value of the sensor's output signal to the mass air flow rate is called a transfer function. This transfer function is normally calibrated in three separate steps. First, the sensor is calibrated to produce a specified signal in response to a preselected mass air flow rate. Next, the gain of the sensor is calibrated to generate a specified change in its output signal in response to a preselected change in the mass air flow. Finally, the response time of the sensor's output signal is calibrated to have a predetermined response time in response to a step change in the mass air flow rate.

The calibration of these parameters, in production, are performed at separate test stations while the sensor is mounted on a test stand in which the sensing elements are exposed to mass air flow rates controlled by sonic nozzles. The sonic nozzles accurately control the mass air flow rate required for the desired calibration. The calibration test stands have inlet geometries which condition the inlet air in an attempt to reduce turbulence of the mass air flow being sensed. However, turbulence is almost always inherent in a system where air is drawn in by a pressure drop or vacuum system where it is very difficult to achieve ideal inlet geometry. The generation of turbulence through the air inlet of these calibration stands result in unrepeatable flow fields and an increased signal-to-noise ratio in the output signal generated by the mass air flow sensor.

SUMMARY OF THE INVENTION

The invention is a method and apparatus for calibrating a mass air flow sensor. The method consists of mounting a mass air flow sensor on a calibration stand, generating an oscillating mass air flow and subjecting the sensing elements of the mass air flow sensor to the oscillating mass air flow causing the mass air flow sensor to generate an output waveform having a frequency and amplitude indicative of the oscillating mass air flow. The method then displays the output waveform on a display having a desired waveform superimposed thereon. The calibration procedure then proceeds to laser trim a first resistance in the mass air flow sensor's electronic circuit to center the displayed output waveform with the desired waveform, trimming a second resistance in the sensor's electronic circuit to calibrate the amplitude of the displayed output waveform to be the same as the amplitude of the desired waveform and trimming a third resistance to calibrate the response time to agree with the response time of the desired waveform.

In the preferred embodiment, the method further includes generating an offset mass air flow which is summed with the oscillating mass air flow. The offset mass air flow has a value selected such that the summed mass air flow is unidirectional in the region of the sensing elements of the mass air flow sensor. In the disclosed embodiment, the mass air flow sensor is attached to a sensor mount having an air flow conduit through which the sum of the oscillating and offset mass air flow passes.

The object of the present, invention is a method and apparatus for the calibration of a mass air flow sensor which produces a very repeatable air flow across the sensing elements of a mass air flow sensor thereby reducing the signal-to-noise ratio of the sensor during calibration.

On advantage of the method is that three separate calibrations of the mass air flow sensor can be performed in one step on a single test stand.

Another advantage is that the oscillating air through the air flow conduit of the mass air flow sensor substantially reduces the turbulence, thereby reducing the signal-to-noise ratio of the sensor's output signal during calibration making the calibration more accurate.

Another advantage is that the production calibration time of the mass air flow sensor has been reduced from approximately 2 minutes to 30 seconds.

These and other advantages of the method and apparatus for calibrating a mass air flow sensor using an oscillating air flow will become more apparent from a reading of the specification in conjunction with the drawing.

DETAILED DESCRIPTION OF THE INVENTION

Figure 1:
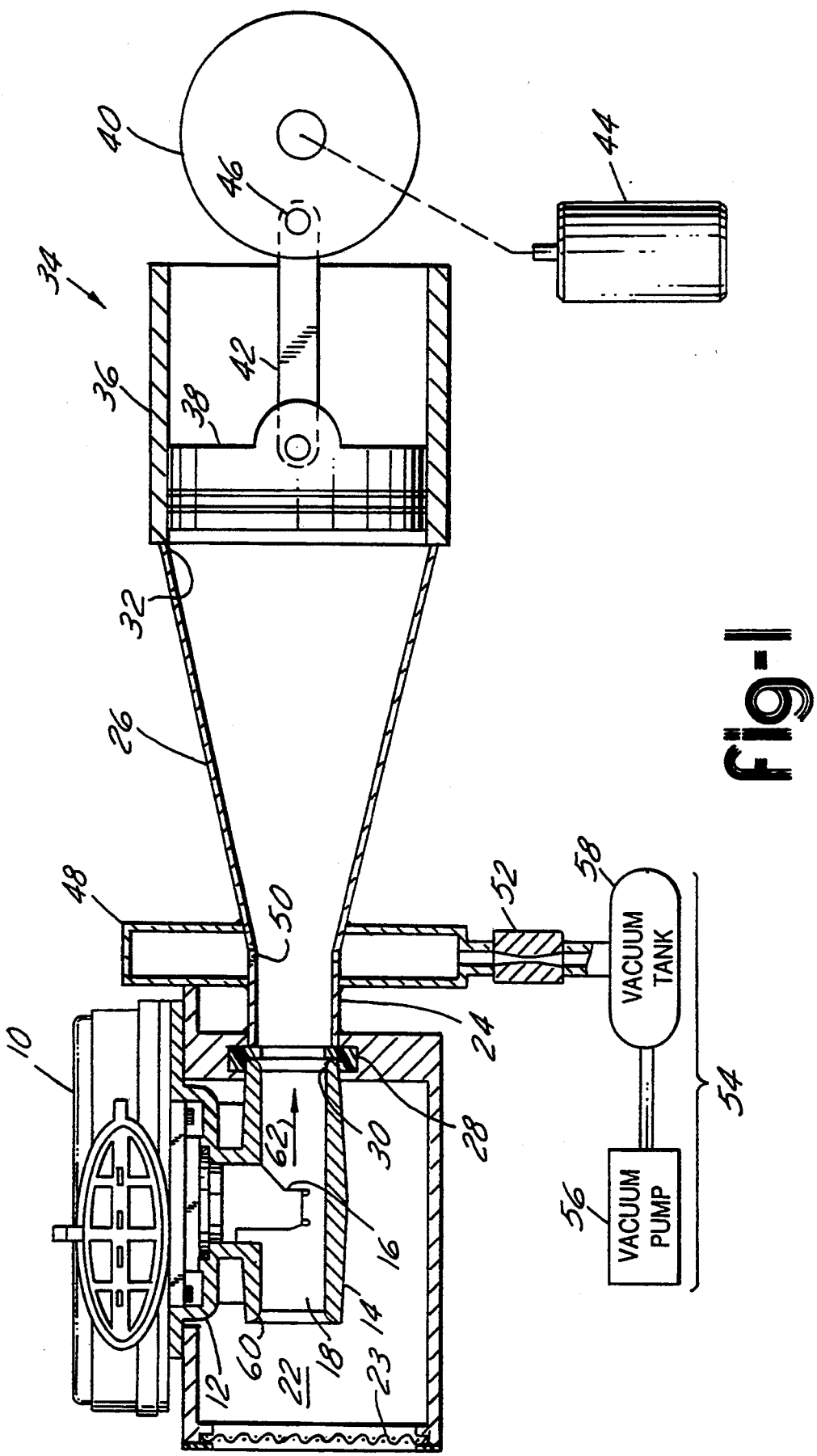
FIG. 1 is a partial cross-sectional view showing the details of the calibration apparatus.

The details of the system for calibrating a mass air flow sensor using an air flow that is oscillated between predetermined values are shown in FIG. 1. In the illustrated embodiment, a mass air flow sensor 10 of the type having a hot element $R_H$ and a cold element $R_C$ is fixedly attached to a sensor mount 12 having an air flow conduit 14. The sensing head 16 of the mass air flow sensor 10 projects into the internal passageway 18 of the air flow conduit 14 exposing the hot element $R_H$ and the cold element $R_C$ to the air flow therethrough.

The sensor mount 12 is mounted on a mounting fixture 20 defining a test chamber 22. One end of the test chamber 22 is covered by air filter 23 and the opposite end is connected to a small diameter portion 24 of a funnel-shaped member 26. A resilient seal 28 is provided adjacent to the small diameter portion 24 of the funnel-shaped member which is sealingly engaged by the outlet end 30 of the air flow conduit 14 when the sensor mount 12 is attached to the mounting fixture 20. A resilient seal 28 provided at the end of the small diameter portion 24 provides a pneumatic seal between the outlet end 30 of the air flow conduit 14 and the small diameter portion 24 of the funnel-shaped member 26.

The large diameter end 32 of the funnel-shaped member 26 is connected to an air flow oscillating mechanism 34. In a preferred embodiment, the air flow oscillating mechanism 34 consists of a cylinder 36 having a diameter substantially the same as the large diameter end 32 of the funnel-shaped member 26, a piston 38 disposed in the cylinder, a rotating crank mechanism 40 and a connecting rod 42 connecting the rotating crank mechanism 40 to the piston 38. The rotating crank mechanism 40 is rotated by an electric motor 44. The connecting rod 42 is connected to a crank pin 46 offset from the axis of rotation of the crank mechanism 40 such that the piston 38 is reciprocated within the cylinder 36 in response to the rotation of the crank mechanism 40 by the electric motor 44. In the preferred embodiment, the piston 38 is reciprocated at a frequency of 50±10 Hertz.

The reciprocation of the piston 38 in cylinder 40 produces an oscillating motion of the air within the funnel-shaped member 26 and within internal passageway 18 of the air flow conduit 14.

A pressure damping chamber 48 is provided adjacent to the small diameter 24 of the funnel-shaped member 26. The annular pressure damping chamber 48 preferably circumscribes the small diameter portion 24 and is connected to the interior of the funnel-shaped member 26 by an annular port 50. A sonic nozzle 52 is connected between the damping chamber 48 and a regulated vacuum source 54 illustrated as a vacuum pump 56 and a vacuum tank 58. As is known in the art, sonic nozzles, such as sonic nozzle 52, are used to precisely control the mass air flow in a pneumatic system. The sonic nozzle 52 is selected to provide a predetermined offset mass air flow through the air flow conduit 14 of the mass air flow sensor 10 which is greater than the mass air flow generated by the piston 38 when it is moving toward the small diameter portion 24 of the funnel-shaped member 26. This guarantees that the mass air flow through the air flow conduit 14 will always be unidirectional and flow in a direction from its inlet end 60 to its outlet end 30 as indicated by arrow 62.

Figure 2:
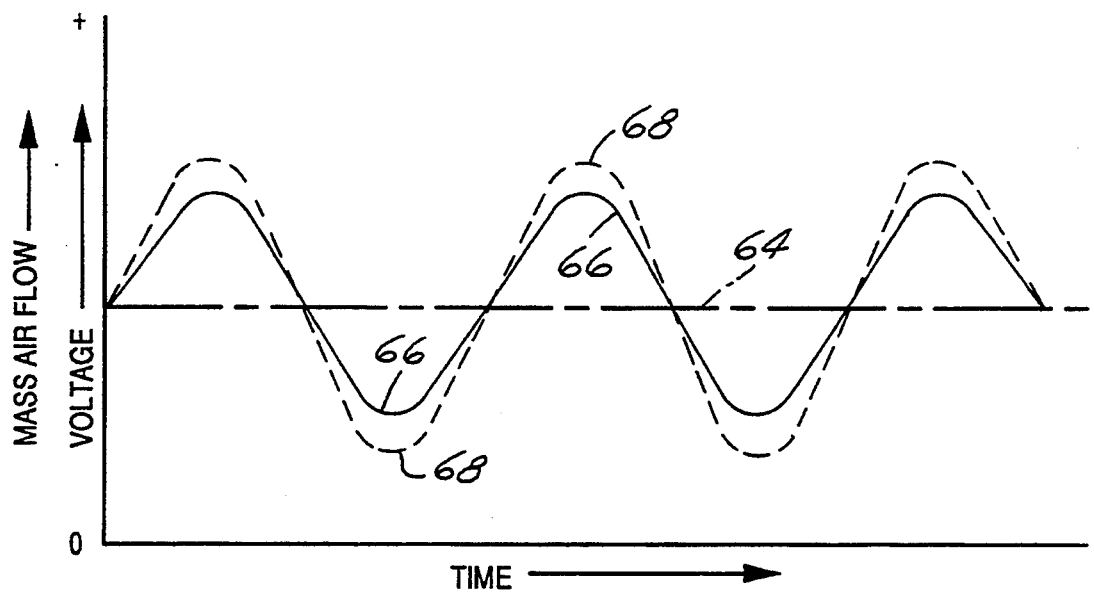
FIG. 2 is a graph showing the waveforms of the generated oscillating mass air flow and the output signal of the mass air flow sensor.

As shown in FIG. 2, the offset mass air flow through the sonic nozzle 52 offsets the oscillatory mass air flow produced by the reciprocation of the piston 38. The offset oscillating mass air flow produced by the sonic nozzle is depicted by the dash-dot line 64, while the output signal of the mass air flow sensor in response to the offset oscillatory mass air flow through the air flow conduit 14 is illustrated by solid sine wave curve 66. In FIG. 2, the oscillating mass air flow through air flow conduit 14 has its peak value when the piston 38 is moving away from the air flow conduit 14 and has its minimum values when the piston 38 is moving toward the air flow conduit 14. As previously discussed, the offset mass air flow through the sonic nozzle 52 is selected so that the sum of the offset and oscillating mass air flow through the air flow conduit is always unidirectional and flows in the direction of arrow 62.

To prevent the oscillatory mass air flow generated by the reciprocation of piston 38 from adversely affecting the mass air flow through the sonic nozzle 52, the volume of the damping chamber 48 is selected to be significantly larger than the air volume displaced by the reciprocating piston 38. Preferably, the volume of the annular damping chamber 48 is five (5) or more times the volume displaced by the piston 38 so that the oscillating air flow produced by the piston 38 will not significantly change the pressure within the annular damping chamber 48 nor the mass air flow through the sonic nozzle 52. Further, isolation of the pressure of the air inside the annular damping chamber 48 may be achieved by controlling the cross-sectional area of the annular port 50 such that the pressure inside the damping chamber 48, due to the offset oscillating mass air flow through the sonic nozzle 52 is slightly less than atmospheric pressure. This will further isolate the pressure inside the damping chamber 48 from pressure fluctuations caused by the oscillations of the air flow inside the funnel 26.

Figure 3:
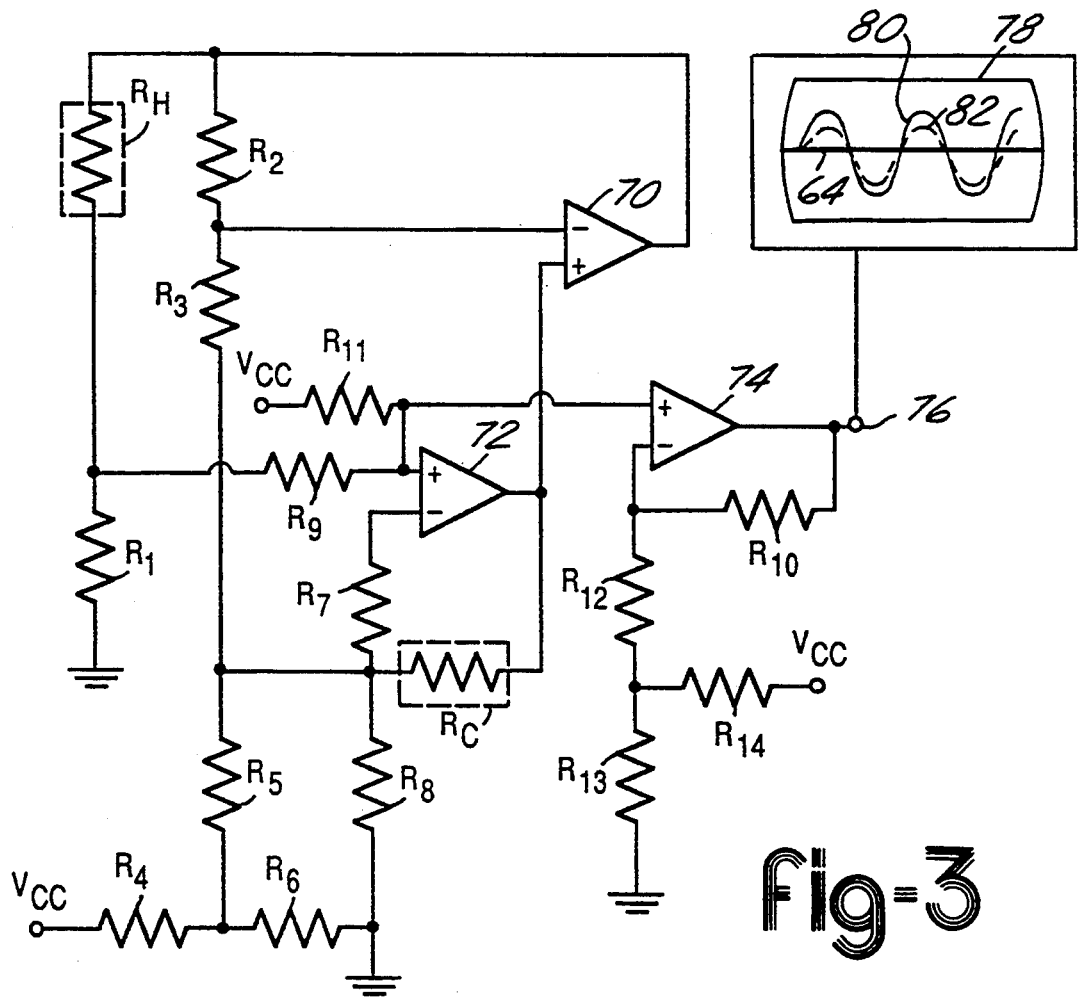
FIG. 3 is an abbreviated circuit diagram of the mass air flow sensor's electronic circuit.

The calibration of the mass air flow sensor 10 using the oscillating air flow through the air flow conduit 14 of the sensor mount 12 shall be discussed relative to the waveforms shown in FIG. 2 and the electronic circuit of the mass air flow sensor 10 shown in FIG. 3. The circuit shown in FIG. 3 is an abbreviated circuit diagram showing only the essential elements of the circuit involved in the calibration of the mass air flow sensor 10.

Referring to the circuit diagram shown in FIG. 3, the sensing head 16 of the mass air flow sensor 10 has a hot or heated element $R_H$ and a cold element $R_C$ which are disposed in the internal passageway 18 of the air flow conduit 14. The heated element $R_H$ and the cold element $R_C$ have a positive thermal coefficient of resistance $\alpha$ such that their resistances increase with temperature.

The heated element $R_H$ is connected in series with a resistance $R_1$ between the output of operational amplifier 70 and ground. A parallel voltage divider network consisting of serially connected resistances $R_2$, $R_3$, $R_5$ and $R_6$ is also connected between the output of operational amplifier 70 and ground in parallel with the heated element $R_H$ and resistance $R_1$. The junction between resistances $R_2$ and $R_3$ is connected to a negative input of operational amplifier 70, while the junction between the heated element $R_H$ and $R_1$ is connected to the positive inputs of operational amplifiers 72 and 74 through a resistance $R_9$. The output of operational amplifier 72 is connected directly to the positive input of operational amplifier 70 and to its own negative input through cold element $R_C$ and a resistance $R_7$. The junction between cold element $R_C$ and resistance $R_7$ is connected to the junction between resistances $R_3$ and $R_5$ and to ground through a resistance $R_8$.

A regulated voltage, designated $V_{cc}$ is connected to the positive inputs to operational amplifiers 72 and 74 through a resistance $R_{11}$, to the junction between resistance $R_5$ and $R_6$ by a resistance $R_4$, and to the junction between serially connected resistances $R_{12}$ and $R_{13}$ connected between the negative input to operational amplifier 74 and ground by a resistance $R_{14}$. The output of operational amplifier 74 is connected to an output terminal 76 and to its negative input by a resistance $R_{10}$. Resistance $R_{10}$ is a feedback resistor controlling the gain of operation amplifier 74. The output of operational amplifier 74 appearing on output terminal 76 is the output signal of the mass air flow sensor 10 indicative of the mass air flow rate sensed by the heated element $R_H$ and the cold element $R_C$.

The circuit shown in FIG. 3 is basically a balanced bridge circuit in which the output of operational amplifier 70 is controlled by the output of operational amplifier 72 to maintain the bridge balanced. The heated element $R_H$, with no mass air flow through the air flow conduit 14, is heated to a predetermined temperature. The heated element $R_H$ will be cooled by an air flow through the air flow conduit 14 which, in turn, decreases its resistance. A decrease in the resistance of the heated element, in turn, increases the potential at the positive input of operational amplifier 72. The increase of the potential at the positive input of operational amplifier 72 increases the potential at the positive input of operational amplifier 70 which, in turn, increases potential across heated element $R_H$ and resistance $R_1$. This process proceeds until the bridge becomes balanced. The potential at the junction between the heated element $R_H$ and $R_1$ increases with the increased potential of the output of operational amplifier 70 and is indicative of the mass air flow across the heated element $R_H$.

The value of the resistance $R_6$ controls an offset value of the output signal generated by the operational amplifier 74 so that its output signal will have a predetermined or selected value for a specified mass air flow rate through the air flow conduit 14 which is controlled by the sonic nozzle 52.

The resistance $R_4$ controls the response time of the mass air flow sensor 10 to a change in the mass air flow rate produced by the reciprocating piston, and the feedback resistance $R_{10}$ controls the gain of operational amplifier 74.

During the test procedure, the air flow through the air flow conduit is regulated to have a predetermined average mass air flow rate determined by the sonic valve 52 while the reciprocating piston 38 oscillates the mass air flow rate through the air flow conduit as shown by curve 66 in FIG. 2. The output of operational amplifier 74 is then displayed on a cathode ray tube 78 having the shape of the desired waveform 80 superimposed thereon. Resistance $R_6$ is first laser-trimmed to center the waveform 82 output by the mass air flow sensor 10 with the desired waveform 80. Resistance $R_{10}$ is then laser-trimmed to calibrate the amplitude of the waveform 82 output by the mass air flow sensor 10 until its amplitude is substantially equal to the amplitude of the desired waveform 80. Finally, resistance $R_4$ is laser-trimmed until the cross-over points of the output signal 82 of the mass air flow sensor with respect to the offset potential 64 corresponds to the cross-over points of the desired waveform 80. A final laser-trimming of resistances $R_6$ and $R_{10}$ may be required to complete the calibration of the mass air flow sensor to conform to the desired waveform 80. In FIG. 3, the illustrated output waveform 82 represents the waveform generated by the mass air flow sensor 10 prior to calibration. After calibration, the waveform 82 is substantially identical to the desired waveform 80.

By using an oscillating mass air flow through the air flow conduit 14 of the sensor mount 12, the output signal of the mass air flow sensor may be calibrated with reference to three different operational values, namely, (1) the calibration of the mass air flow sensor's output signal to have a potential having a specified value for a predetermined mass air flow, (2) the calibration of the gain of the output signal of the mass air flow sensor so that the potential of the output signal will change by a specified value in response to a predetermined change in the mass air flow being detected, and (3) the calibration of the response time of the mass air flow sensor's output signal to be within specified limits.

Having disclosed the method and apparatus for calibrating the output of a mass air flow sensor using an oscillating mass air flow, it is recognized that those skilled in the art may make certain changes and improvements thereto with the scope of the invention as set forth in the appended claims.

We claim:

1. A method for calibrating a mass air flow sensor having an electronic circuit, comprising the steps of:
    mounting said mass air flow sensor on a test stand;
    generating an oscillating mass air flow;
    subjecting said mass air flow sensor to said oscillating mass air flow rate to generate an output waveform having an amplitude indicative of said oscillating mass air flow rate;
    displaying said output waveform on a display device, said display having a desired waveform, said desired waveform having a specified amplitude, a specified offset and a specified response time;
    laser-trimming a first resistance of said electronic circuit to calibrate said output waveform to have an offset equal to said specified offset;
    laser-trimming a second resistance of said electronic circuit to calibrate said amplitude of said output waveform to be substantially equal to said specified amplitude; and
    laser-trimming a third resistance of said electronic circuit to calibrate the response time of said output waveform to be substantially equal to said specified response time.

2. The method of claim 1 wherein said mass air flow sensor is attached to a sensor mount having an air flow conduit and said mass air flow sensor has a sensing head detecting the mass air flow in said air flow conduit, said step of subjecting said mass air flow sensor to said oscillating mass air flow rate includes the step of conducting said oscillating mass air flow rate to flow through said air flow conduit.

3. The method of claim 2 wherein said step of generating an oscillating mass air flow comprises the steps of:
    reciprocating a piston within a cylinder to produce an oscillating mass air flow; and
    communicating said oscillating mass air flow in said air flow conduit.

4. The method of claim 3 wherein said step of generating further includes the step of generating an offset mass air flow through said air flow conduit, said offset mass air flow offsetting said oscillating mass air flow by a value sufficient to maintain a unidirectional mass air flow through said air flow conduit.

5. The method of claim 4 wherein said step of generating an offset mass air flow comprises the steps of:
    connecting a sonic valve in fluid communication with said air flow conduit; and
    connecting said sonic valve to a vacuum source, said vacuum source causing said offset mass air flow to flow through said sonic valve, said sonic valve controlling the value of said offset mass air flow.

6. The method of claim 5 wherein said oscillating mass air flow produces pressure fluctuations, said method further including the step of damping in a damping chamber said pressure fluctuations prior to said offset mass air flow passing through said sonic valve.

7. The method of claim 1 wherein said step of generating an oscillating mass air flow comprises the step of reciprocating a piston.

8. The method of claim 1 wherein said step of generating an oscillating mass air flow further comprises the step of generating an offset mass air flow, said offset mass air flow offsetting said oscillating mass air flow by a value sufficient to cause said oscillating mass air flow to be a unidirectional mass air flow.

* * * * *